United States Patent
Bradshaw et al.

[11] Patent Number: 6,101,157
[45] Date of Patent: Aug. 8, 2000

[54] APPARATUS AND METHOD FOR FOCUS CONTROL OF READ LIGHT IRRADIATED ON A RECORDING SURFACE

[75] Inventors: Alex Bradshaw; Kazushige Kawana; Masakazu Takahashi; Yuichi Kimikawa; Hitoshi Yamazaki; Hideaki Watarihana, all of Kawagoe, Japan

[73] Assignee: Pioneer Electronic Corporation, Tokyo, Japan

[21] Appl. No.: 09/104,930

[22] Filed: Jun. 26, 1998

[30] Foreign Application Priority Data

Jun. 27, 1997 [JP] Japan ................................. 9-208274
Oct. 13, 1997 [JP] Japan ................................. 9-279078

[51] Int. Cl.⁷ ....................................................... G11B 7/09
[52] U.S. Cl. .................................. 369/44.35; 369/44.25; 369/44.29; 369/44.36
[58] Field of Search ............................. 369/44.35, 44.36, 369/44.29, 44.25, 44.27, 54

[56] References Cited

U.S. PATENT DOCUMENTS

| | | | |
|---|---|---|---|
| 5,610,886 | 3/1997 | Hayashi et al. ....................... | 369/44.35 |
| 5,682,372 | 10/1997 | Yamakawa et al. ................... | 369/44.25 |
| 6,011,762 | 1/2000 | Watanabe et al. .................... | 369/44.25 |
| 6,028,826 | 2/2000 | Yamamoto et al. ................... | 369/44.35 |

*Primary Examiner*—Thang V. Tran
*Attorney, Agent, or Firm*—Morgan, Lewis & Bockius LLP

[57] ABSTRACT

Apparatus and method for focus control are devised to cope with a fluctuation of an optimum gain of a focus servo loop due to a difference between light reflectance of recording surfaces or the like and to allow an optimum focal position of read light to preferably trace a target recording surface. The focus control apparatus of the invention includes: reading device for generating a read signal of a recording medium 1; a focus servo loop for allowing an optimum converging position of the read light to trace the target recording surface in accordance with a focus error signal FE by using a focusing actuator to displace the optimum converging position of the read light in the optical axial direction; a level detecting unit of the read signal; a level detecting unit of an error signal FE; amplifiers and of a read signal RF and the error signal FE; and a control unit for driving the actuator so as to allow the optimum converging position of the read light to approach the recording surface in the set-up mode and for controlling gains of the amplifiers so that a detection level by the detecting unit in the set-up mode reaches a predetermined level and a detection level by a detecting unit reaches a predetermined level.

14 Claims, 5 Drawing Sheets

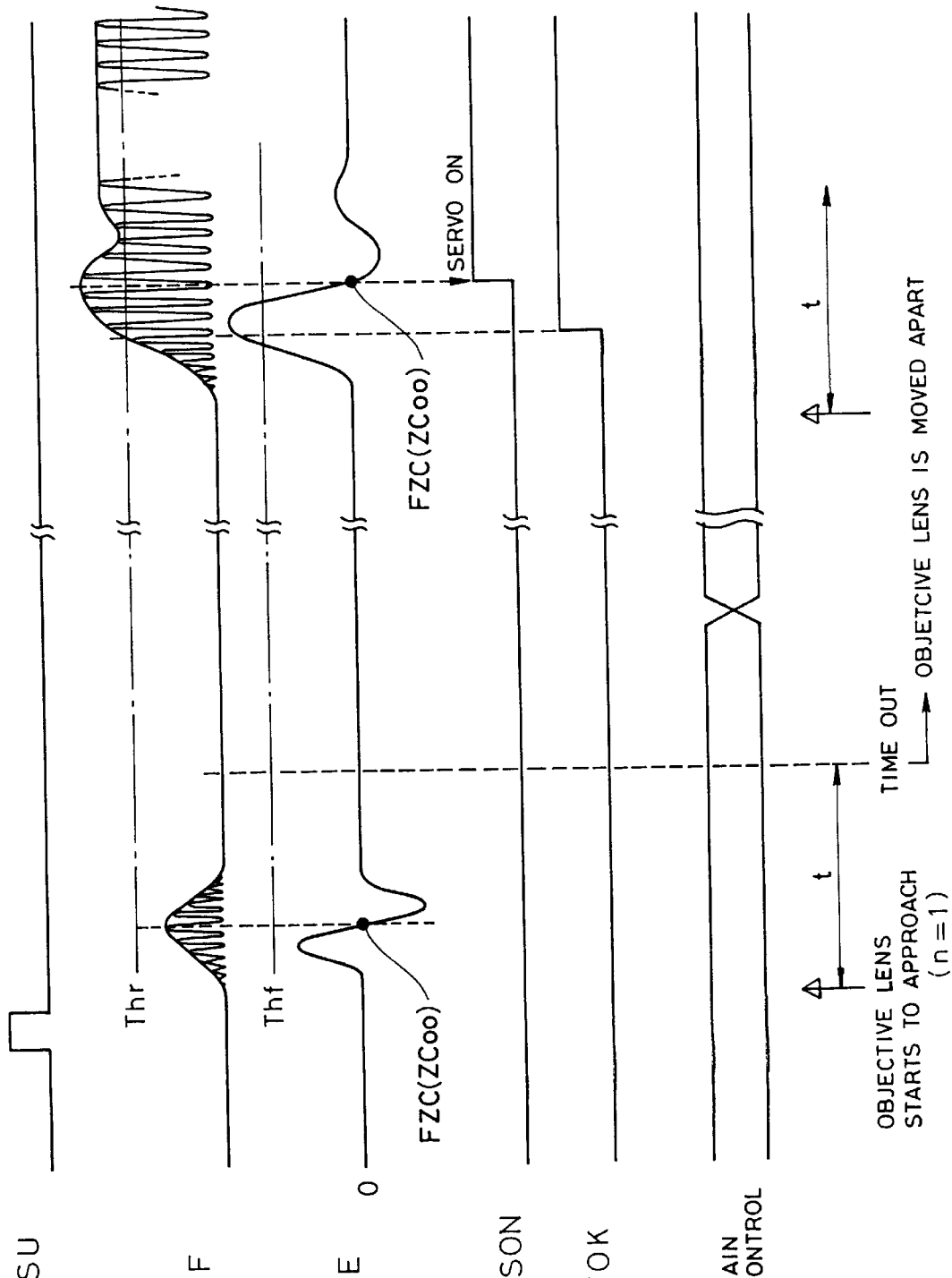

APPARATUS AND METHOD FOR FOCUS CONTROL OF READ LIGHT IRRADIATED ON A RECORDING SURFACE

BACKGROUND OF THE INVENTION

1. Field of the Invention

The invention relates to a focus control apparatus and a focus control method and, more particularly, to focus control apparatus and method for performing a control operation to attain an optimum converging position of read light which is irradiated to a predetermined recording surface of a recording medium, with respect to the recording surface.

2. Description of Related Art

Nowadays, an information recording medium of high recording density and a large capacity, called a digital video disc or digital versatile disc (abbreviated as a DVD) and a system using this medium are being used widely. As such a disc, there is a type in which information recording surfaces are formed in upper and lower two layers which sandwich an intermediate layer (spacer or space region). To read the disc of this type by an optical pickup from one of the disc surfaces, a focal point (focal position or optimum converging position) of the read light has to be positioned on the information recording surface in a desired one of the layers.

Hitherto, in a reading system of a well-known compact disc (CD) having an information recording surface in a single layer, an initial focus control procedure described below is conventionally adopted in a set-up mode to again read the disc just after a power source of a player is turned on, just after a disc has been loaded into a disc player, or the like. In such an initial focus control procedure, the focal point of the read light is moved from a position away from the recording surface of the disc to be read so as to approach the recording surface, a focus servo loop is closed at a predetermined zero-cross point in an S-shaped waveform of a focus error signal which is generated based on an output of a pickup during the movement, then a tracing operation of the read light focal point to the recording surface is started.

FIG. 1 shows a relationship between the position, in an inner layer of the disc, of a focal point P of the read light which is determined by an objective lens 100 and a level FE of the focus error signal which is obtained when the focal point P is moved in the optical axial direction. It will be understood that the focus error signal fundamentally draws an S-shaped curve around a zero level (zero-cross point ZC00, ZC10) that is obtained in a state where the focal point P is positioned on the recording surface, wherein the zero level corresponds to a center of the S-shaped curve. A period of time between the minimum value and the maximum value of one S-shaped curve almost corresponds to a control range of the focus servo loop.

The initial focus control in this case is performed in a manner such that when the first recording surface on the objective lens side is read, the focus servo loop is closed in response to a detection timing of the zero-cross point ZC00 and, when the second recording surface on the inside is read, the focus servo loop is closed in response to a detection timing of the zero-cross point ZC10.

With respect to the feature that the focus servo loop is closed when the focal point of the read light is positioned on the recording surface to be read as mentioned above, the reading of the double-layer recording disc is the same as that of the conventional CD. In the single-layer type recording disc like a CD and the multilayer type recording disc, however in particular, since the recording surface's light reflectance differs largely between the single-layer type recording disc and the multilayer type recording disc, a situation occurs such that a gain of the focus servo loop for the recording surface of the disc of one of the types and a gain for the recording surface of the disc of the other type are remarkably different. In this situation, even if the focusing servo adapted to the disc of one type is applied to the disc of the other type, it takes relatively a long time for settlement of the servo operation after the focus servo loop is closed. In the worst case, the read light cannot be focused on the target recording surface. In this way, failure of the focusing set-up operation can be resulted.

The above problem shall also apply to each of one and the other recording surfaces of the multilayer type recording disc. Furthermore, it occurs not only by the difference of the light reflectance between the recording surfaces but also by fouling of the objective lens in association with the aging change or the like or deterioration of the other optical systems.

OBJECTS AND SUMMARY OF THE INVENTION

The present invention invention has been made in view of the point described above, and it is an object of the invention to provide apparatus and method for the focus control which can cope with a fluctuation of an optimum gain of a focus servo loop due to a difference of light reflectance of recording surfaces or the like and can attain an optimum focal position of the read light to preferably trace a target recording surface.

According to the first aspect of the invention, there is provided a focus control apparatus which includes, reading means for irradiating read light to a recording medium having an information recording surface which is formed in at least one layer and generating a read signal based on return light from the recording medium, and a focus servo loop for allowing an optimum converging position of the read light to trace the recording surface in response to a focus error signal generated based on the return light by using a focusing actuator to displace the optimum converging position of the read light in the optical axial direction, the focus control apparatus comprising: read signal level detecting means for detecting a level of the read signal; read signal amplifying means for amplifying the read signal; error signal amplifying means for amplifying the focus error signal; and control means for driving the focusing actuator in a set-up mode so that the optimum converging position of the read light approaches the recording surface and for controlling gains of the read signal amplifying means and the error signal amplifying means so that a detection level by the read signal level detecting means in the set-up mode reaches a predetermined level.

According to the second aspect of the invention, there is provided a focus control apparatus which includes, reading means for irradiating read light to a recording medium having an information recording surface which is formed in at least one layer and generating a read signal based on a return light from the recording medium, and a focus servo loop for allowing an optimum converging position of the read light to trace the recording surface in response to a focus error signal generated based on the return light by using a focusing actuator to displace the optimum converging position of the read light in the optical axial direction, the focus control apparatus comprising: error signal level detecting means for detecting a level of the focus error signal; read signal amplifying means for amplifying the read signal; error signal amplifying means for amplifying the focus error signal; and control means for driving the focusing actuator in a set-up mode so that the optimum converging position of the read light approaches the recording surface and for controlling gains of the read signal amplifying means and the error signal amplifying means so that a detection level by the error signal level detecting means in the set-up mode reaches a predetermined level.

According to the third aspect of the invention, there is provided a focus control apparatus which includes, reading means for irradiating read light to a recording medium having an information recording surface which is formed in at least one layer and generating a read signal on the basis of a return light from the recording medium, and a focus servo loop for allowing an optimum converging position of the read light to trace the recording surface in response to a focus error signal generated based on the return light by using a focusing actuator to displace the optimum converging position of the read light in the optical axial direction, the focus control apparatus comprising: read signal level detecting means for detecting a level of the read signal; error signal level detecting means for detecting a level of the focus error signal; read signal amplifying means for amplifying the read signal; error signal amplifying means for amplifying the focus error signal; and control means for driving the focusing actuator in a set-up mode so that the optimum converging position of the read light approaches the recording surface and for controlling gains of the read signal amplifying means and the error signal amplifying means so that a detection level by the read signal level detecting means in the set-up mode reaches a predetermined level and a detection level by the error signal level detecting means reaches a predetermined level.

According to the fourth aspect regarding each of the first to third aspects, the apparatus further has a variable gain type signal forming circuit for generating the read signal and the focus error signal on the basis of the return light by the set gains, and the control means can also control a gain of the variable gain type signal forming circuit besides the gain control of the read signal amplifying means and the error signal amplifying means.

According to the aspect regarding the first aspect, the control means can also execute the stationary focusing servo operation by the focus servo loop in the case where the detection level by the read signal level detecting means in the set-up mode reaches the predetermined level.

According to the aspect regarding the second aspect, the control means can also execute the stationary focusing servo operation by the focus servo loop in the case where the detection level by the error signal level detecting means in the set-up mode reaches the predetermined level.

According to the aspect regarding the third aspect, the control means can also execute the stationary focusing servo operation by the focus servo loop in the case where the detection level by the read signal level detecting means in the set-up mode reaches the predetermined level and the detection level by the error signal level detecting means in the set-up mode reaches the predetermined level.

According to the aspect regarding the first aspect, in the case where it is determined that the detection level by the read signal level detecting means in the set-up mode cannot reach the predetermined level as results of the gain controls of the read signal amplifying means and the error signal amplifying means, the control means can also notify of such a fact.

According to the aspect regarding the second aspect, in the case where it is determined that the detection level by the error signal level detecting means in the set-up mode cannot reach the predetermined level as results of the gain controls of the read signal amplifying means and the error signal amplifying means, the control means can also notify of such a fact.

According to the aspect regarding the third aspect, in the case where it is determined that the detection level by the read signal level detecting means in the set-up mode cannot reach the predetermined level and/or the detection level by the error signal level detecting means in the set-up mode cannot reach the predetermined level as results of the gain controls of the read signal amplifying means and the error signal amplifying means, the control means can also notify of such a fact.

According to the aspect regarding the fourth aspect, in the case where it is determined that the detection level by the read signal level detecting means in the set-up mode cannot reach the predetermined level and/or the detection level by the error signal level detecting means in the set-up mode cannot reach the predetermined level as results of the gain controls of the read signal amplifying means, the error signal amplifying means, and the variable gain type signal forming circuit, the control means can also notify of such a fact.

According to the invention, there is provided a focus control method of obtaining a focus error signal and an RF signal at proper levels, comprising the steps of: executing a detecting process for detecting a signal level of at least one of the focus error signal and the RF signal; executing a discriminating process for discriminating whether the detection signal level exceeds the predetermined level or not as a result of the detecting process; adjusting amplification factors of amplifiers or forming circuits of the focus error signal and the RF signal so as to increase the signal levels of the focus error signal and the RF signal when the detection signal level does not exceed the predetermined level and again executing the detecting process and the discriminating process; and executing a stationary focusing servo operation by a focus servo loop when the detection signal level exceeds the predetermined level.

BRIEF DESCRIPTION OF THE DRAWINGS

FIGS. 5A to 5F are diagrams showing an operation waveform and an operating form in each section of the embodiment corresponding to the processes shown in FIGS. 3 and 4.

DETAILED DESCRIPTION OF THE PREFERRED EMBODIMENT

An embodiment of the invention will now be described in detail hereinbelow with reference to the drawings.

Figure 2:
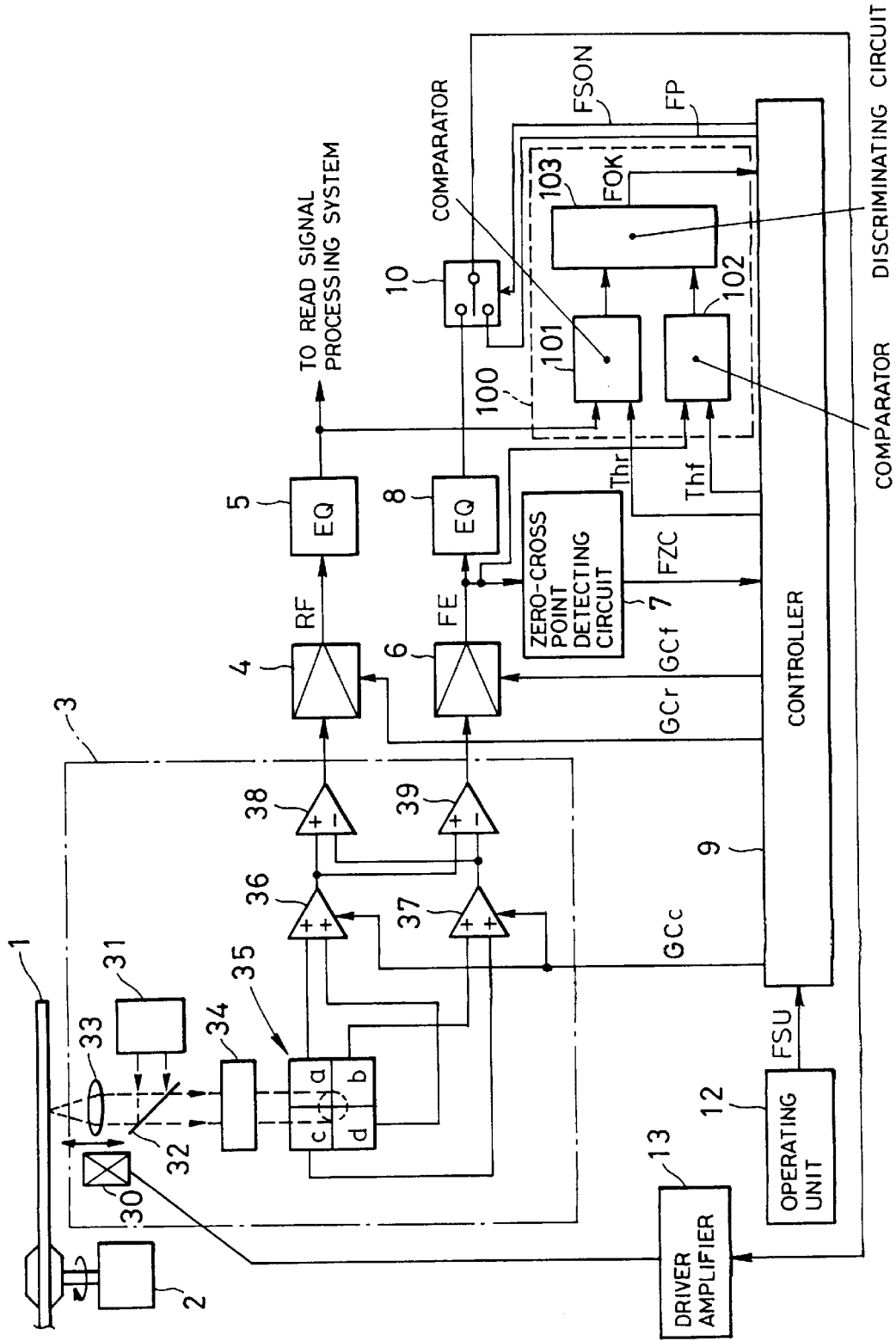
FIG. 2 is a block diagram showing a schematic construction of an optical disc player to which a focus control apparatus in an embodiment according to the invention is plied.

FIG. 2 shows a schematic construction of an optical disc player using a focus control apparatus in the embodiment according to the invention.

In FIG. 2, a disc 1 loaded into the player is rotated by a spindle motor 2 and read light emitted from a pickup 3 is irradiated onto the disc 1 during the rotation. The read light reaches a recording surface through a protecting layer of the disc 1 and is modulated by what are called recording marks such as pits or the like which are formed on the recording surface and indicate recording information and is returned to the pickup 3 as reflection light from the recording surface.

The pickup 3 not only emits the read light but also executes a photoelectric conversion for receiving the reflection light from the disc 1 and generating various electric signals according to a light amount and/or a state of the reflection light. An optical system of the pickup 3 is constructed by: for example, a read light emitting system 31 including a laser diode serving as a light source; a beam splitter 32 for reflecting the read light emitted from the read light emitting system; an objective lens 33 for converging the reflected read light onto the recording surface of the disc 1 and guiding the return light from the disc to the beam splitter 32; an astigmatism applying optical system 34 such as a cylindrical lens or the like for giving an astigmatism to the return light transmitted through the beam splitter 32; and a 4-split photodetector 35, as shown in the diagram, for receiving the return light transmitted through the optical system 34. A photo receiving surface of the 4-split photodetector 35 has four photo-sensing units a, b, c, and d divided by two straight lines which perpendicularly cross at the photo-sensing center. The photo-sensing units are arranged so that one of the straight lines is parallel with the track tangential direction of the disc 1.

A read signal [what is called an RF (Radio Frequency) signal] having mainly a signal component according to recording information of the disc 1 can be obtained by the sum of photoelectric conversion signals from the photo-sensing units a, b, c, and d. Specifically speaking, adding circuits 36 and 37 each for adding the two photoelectric conversion signals of the photo-sensing units (a and d; b and c) which are located point-symmetrically with respect to the photo-sensing center on the photo-sensing surface of the photodetector 35 and an adding circuit 38 for further adding both output signals of the adding circuits are provided. A read signal is generated by an output [(a+d)+(b+c)] of the adding circuit 38 at the final stage. The read signal can be also generated by other various well-known methods.

A focus error signal mainly according to an error of the optimum converging position of the read light for the recording surface of the disc 1 is obtained by adding the photoelectric conversion signals of the photo-sensing units (a and d; b and c) locating point-symmetrically with respect to the photo-sensing center and obtaining the difference between the two addition signals thus obtained on the basis of a principle such that the reflection light changes a shape and an intensity on the photo-sensing surface of the photodetector 35 in accordance with a focal state of the read light for the recording surface of the disc. That is, the focus error signal is generated by an output [(a+d)−(b+c)] of a subtracting circuit 39 for subtracting the output signals of the adding circuits 36 and 37. The focus error signal can be also formed by other various well-known methods.

It should be noted that the adding circuits 36 and 37 have a construction of a variable gain type. Gain control signals, therefore, to control gains (amplification factors) are supplied to the adding circuits 36 and 37. In the example, a construction to commonly control the gains of the adding circuits 36 and 37 is used and a same gain control signal GCc is supplied to control input terminals of both adding circuits.

After the read signal generated as mentioned above was amplified by an RF amplifier 4, it is transmitted to a read signal processing system (not shown) through an equalizer 5. Equalizing characteristics of the equalizer 5 can be changed by an instruction signal from a controller 9. The read signal processing system reproduces a final audio or video signal or a computer data signal from the read signal and transfers the reproduction signal to, for example, the outside of the player. The RF amplifier 4 is also a variable gain type amplifier and its gain (amplification factor) is controlled in accordance with a gain control signal GCr which is supplied.

As for the pickup 3, although there is a construction to generate a tracking error signal besides the read signal and the focus error signal, it is not shown here. The tracking error signal is supplied to a tracking servo system (not shown). In the tracking servo system, the irradiating position of the read light is controlled so as to coincide with the center of the recording track on the disc 1 in response to the tracking error signal. Although there is also a 3-beam method as a generating method of the tracking error signal, in case of obtaining a tracking error by a single light beam, there is also a method called a phase difference method or a push-pull method.

A focusing actuator 30 to move the objective lens 33 for irradiating the read light emitted from the light source to the disc 1 in the optical axial direction is built in the pickup 3. The focusing actuator 30 displaces the objective lens 33 in the direction perpendicular to the surface of the disc 1 in accordance with a level and a polarity of a drive signal, which will be explained later.

The focus error signal which is derived from the subtracting circuit 39 serving as an output stage of the pickup 3 is supplied to an error amplifier 6. The focus error signal FE amplified by the error amplifier is supplied to a zero-cross point detecting circuit 7, an equalizer 8, and a reading state discriminating circuit 100, which will be explained later. The error amplifier 6 is also an amplifier of the variable gain type and a gain (amplification factor) is controlled in accordance with a gain control signal GCf which is supplied.

The zero-cross point detecting circuit 7 detects that the level of the focus error signal FE has passed a predetermined level, in the example, the zero level, generates a zero-cross point detection signal FZC according to the detection result, and supplies to the controller 9. A detailed detection principle of the zero-cross point detecting circuit 7 and a detailed state of the zero-cross point detection signal FZC will be described later.

The equalizer 8 executes a waveform equalizing process to the supplied focus error signal FE and supplies the equalized focus error signal to one input terminal of a loop switching circuit 10. Equalizing characteristics of the equalizer 8 can be changed by an instruction signal from the controller 9. A forced signal FP from the system controller 9, which will be explained later, is supplied to the other input terminal of the switching circuit 10. The switching operation of the switching circuit is controlled so as to selectively transmit either one of the equalized focus error signal and the forced signal FP in accordance with a focus-on signal FSON. When the focus-on signal FSON indicates that the focus servo loop should be closed, the focus error signal from the equalizer 8 is selected and supplied to a driver amplifier 13. When the focus-on signal FSON indicates that the loop is opened and the focusing actuator 30 should be forcibly driven, the forced signal FP from the system controller 9 is selected and transferred to the driver amplifier 13.

The controller 9 executes various controls and processes in the player. However, as for the operation for moving the focal position of the read light to a target recording surface (hereinafter, abbreviated to set-up or focusing set-up) in what is called an initial operation to again read the disc, the controller 9 executes the process corresponding to the focusing set-up operating mode in response to a focusing set-up instruction signal FSU from an operating unit 12 serving as instructing means.

The process in the set-up operating mode is executed in cooperation with the reading state discriminating circuit 100. The reading state discriminating circuit 100 has: a comparator 101 serving as read signal level detecting means for comparing the level of the read signal from the equalizer 5 with a threshold level Thr which is supplied from the controller 9 and generating the comparison result; a comparator 102 serving as error signal level detecting means for comparing the level of the focus error signal from the error amplifier 6 with a threshold level Thf which is supplied from the controller 9 and generating the comparison result; and a discriminating circuit 103 for discriminating the reading state on the basis of comparison outputs of the comparators 101 and 102 and generating a focusing servo activation permission signal FOK which is validated in the case where the reading state is determined to be good. By receiving the focusing servo activation permission signal FOK, the controller 9 detects the completion of the set-up of the read signal system and the focusing servo system, connects the setting of the focus servo loop at that time, and allows the servo to be started. The details of the operation will be explained later.

An output signal of the switching circuit 10 is supplied to the driver amplifier 13. The driver amplifier 13 generates a drive signal according to the output of the switching circuit 10 and supplies to the focusing actuator 30. At the time of the closing of the focus servo loop in which the switching circuit 10 selects one of the inputs and relays the output signal of the equalizer 8 to the driver amplifier 13, the focusing actuator 30 is driven so that the level of the focus error signal FE is equal to zero, namely, the focal position of the read light traces the recording surface. On the other hand, at the time of the opening of the focus servo loop in which the switching circuit 10 selects the other input and relays and supplies only the forced signal FP to the driver amplifier 13, the focusing actuator 30 is driven so that the focal position of the read light is forcibly moved to the target recording surface or is away from the target recording surface in accordance with the forced signal FP.

The process of the focusing set-up operation which is executed by the controller 9 in cooperation with the reading state discriminating circuit 100 will now be described in detail.

Figure 3:
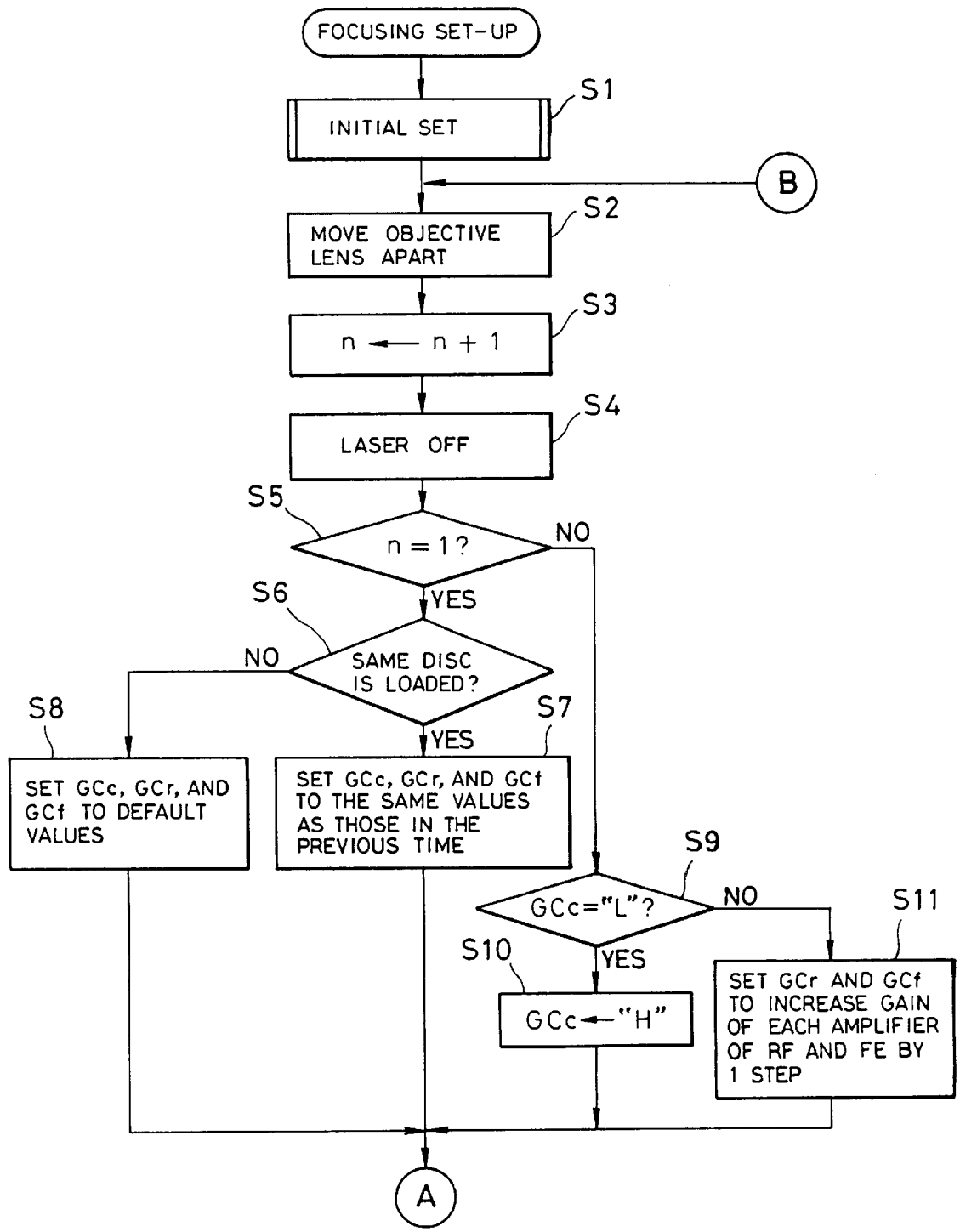
FIG. 3 is a former half flowchart showing a processing procedure of the focusing set-up operation which is executed by a controller in the player of FIG. 2.
Figure 4:
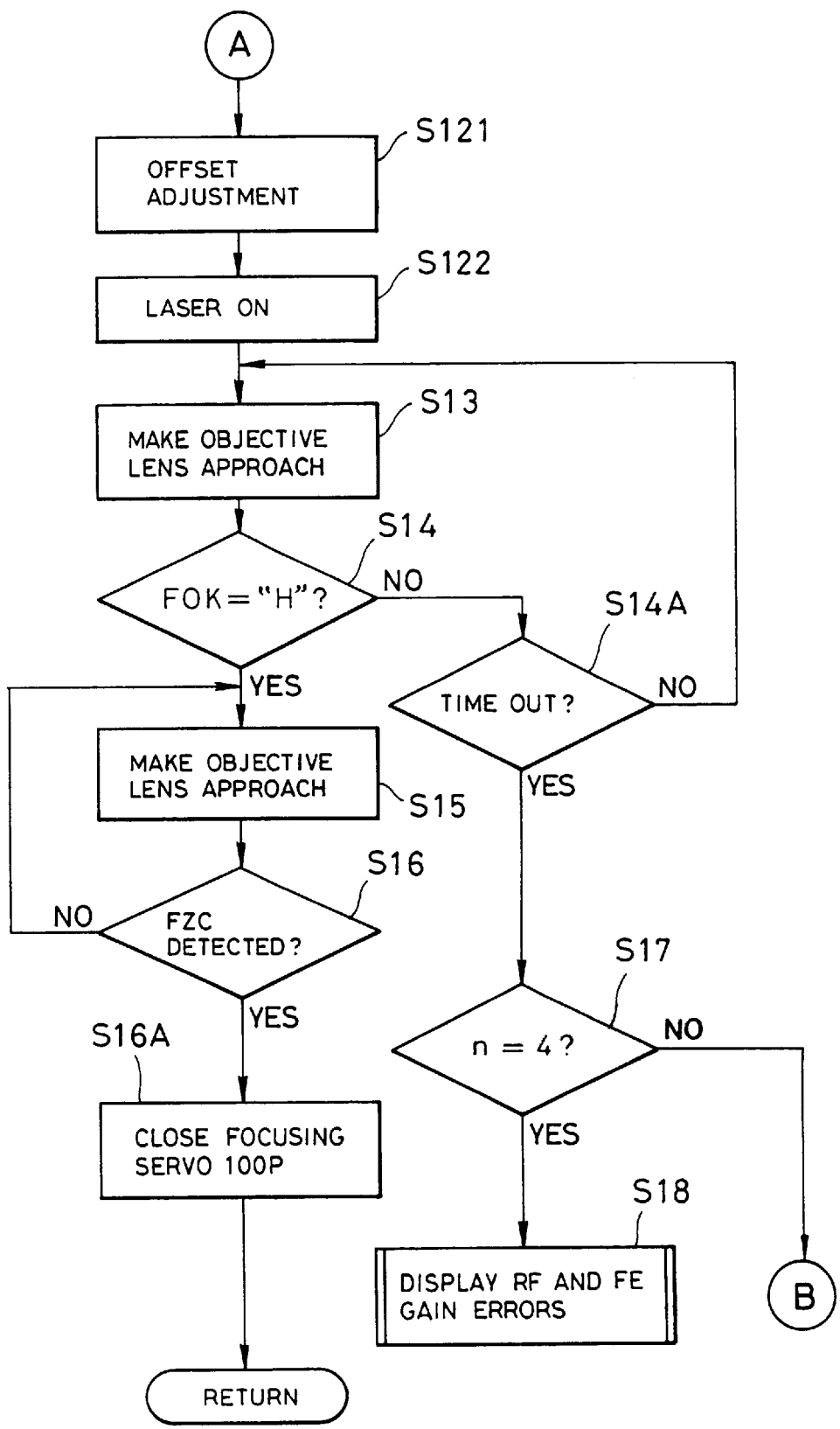
FIG. 4 is a latter half flowchart showing the processing procedure of the focusing set-up operation which is executed by he controller in the player of FIG. 2.

FIGS. 3 and 4 show a processing procedure for the above operation. When the focusing set-up instruction signal FSU is received from the operating unit 12, the controller 9 first executes various necessary initial setting operations by interrupting the process which has been executed so far (step Si). Output waveforms and operating states in respective sections regarding the processes in FIGS. 3 and 4 are shown in FIGS. 5A to 5F. The set-up instruction signal FSU is shown by a pulse waveform at the high level. The initial setting in step S1 includes: a setting of the characteristics of the equalizers 5 and 8; a process for activating the spindle motor 2; a process for resetting a counter n in the controller; and further, a process for setting the focus-on signal FSON to the low level (namely, process for allowing the switching circuit 10 to open the focus servo loop and enabling the forced signal FP to be supplied to the driver amplifier 13).

The controller 9 subsequently performs a control for supplying the forced signal FP to the driver amplifier 13 and allowing the objective lens 33 to be away from the disc 1 by only a predetermined interval or to be moved to a predetermined position (step S2). The controller 9 counts up the counter n by "1" (step S3) and turns off a laser diode serving as a read light source in the pickup 3 (step S4). The controller 9 discriminates whether the value of the counter n is equal to 1 or not (step S5). If it is equal to 1, a check is made to see if the same disc as that at the time of the previous set-up operation has been loaded in the player (step S6).

When it is determined in step S6 that the same disc has been loaded, the controller 9 sets the gain control signals GCc, GCr, and GCf to the same values as those upon previous set-up time (step S7). The adding circuits 36 and 37, consequently, are controlled to the same gains as the previous ones. The RF amplifier 4 and error amplifier 6 are also controlled to the same gains as the previous ones. In step S6, when it is determined that the loaded disc is different from that at the previous set-up time, the controller 9 sets the gain control signals GCc, GCr, and GCf to default values (initial values) (step S8). The adding circuits 36 and 37, RF amplifier 4, and error amplifier 6 are, thus, controlled to the corresponding default gains, respectively. In the embodiment, the gain control signal GCc is set to either one of the high level ("H") and the low level ("L") and "L" is set as a default value. "L" of the gain control signal GCc sets the gains of the adding circuits 36 and 37 to low values. "H" sets them to values higher than those values.

In step S5, when it is determined that the value of the counter n is equal to or larger than 2, namely, the gain control of each adding circuit and the amplifier has once been finished, the controller 9 discriminates whether the gain control signal GCc is equal to "L" or not (step S9). When the gain control signal GCc is equal to "L", the controller 9 sets the gain control signal GCc to "H" (step S10). If n=2 when the processing routine advances to step S9, therefore, only in the case where the gain control signal GCc at the time of n=1 is set to "L", the value of the gain control signal GCc changes to "H". After the gain control signal GCc was set to "H", "H" is maintained without changing the value.

If the gain control signal GCc is equal to "H" in step S9, the controller 9 sets the values of the gain control signals GCr and GCf so that the gains of the RF amplifier 4 and error amplifier 6 are raised by only each predetermined change width (step S11).

When the setting of the gain control signal in step S7, S8, S10, or S11 is finished, to correct an offset change in association with the gain setting, the controller 9 executes, for example, an offset adjustment to the amplifiers 4 and 6 or adders 36 and 37 by a construction (not shown) with respect to the signals RF and FE (step S121). The laser diode of the pickup 3 is turned on so as to emit the read light (step S122). The offset adjustment can be also executed to a system of a tracking error signal TE.

Figure 1:
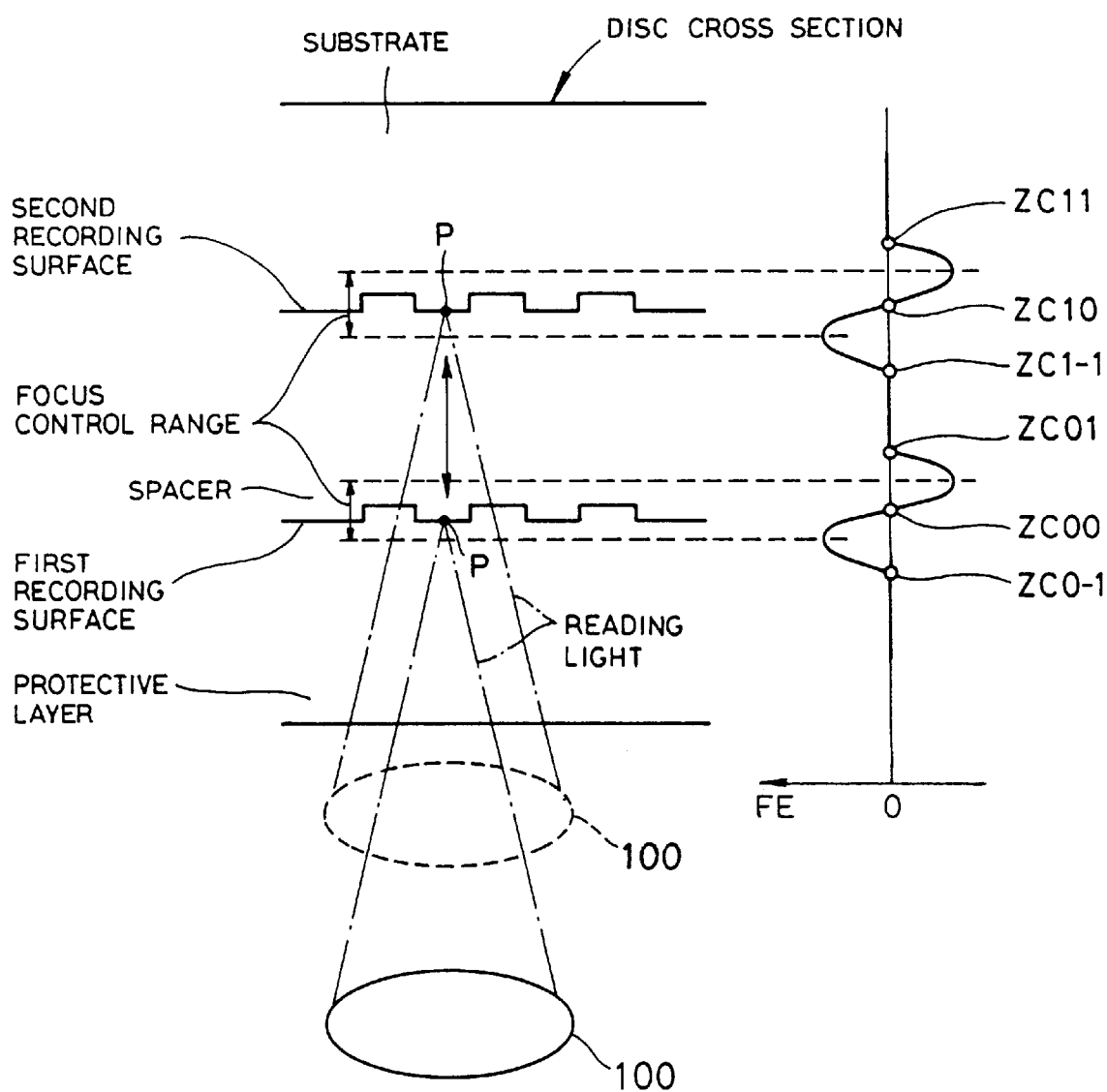
FIG. 1 is diagram showing the relation between the position in an inner layer of a disc of a focal point of read light in an ordinary focus jumping operation and the level of a focus error signal which is obtained when the focal point moves in the optical axial direction.

After that, a control to supply the forced signal FP to the driver amplifier 13 and to allow the objective lens 33 to approach the disc 1 is performed (step S13). When the focal point of the read light, thus, approaches the target recording surface from a remote position and, further, approaches closer and enters a region near the focus control range (refer to FIG. 1), as shown in FIG. 5C, the focus error signal FE starts to generate a mountain-like wave. The level of the read signal RF also rises in correspondence to the inclination of the mountain-like wave.

In this instance, the reading state discriminating circuit 100 monitors the levels of the read signal and the focus error signal by the comparators 101 and 102. The comparison results about whether the read signal exceeds the threshold level Thr or not and whether the focus error signal exceeds the threshold level Thf or not are generated to the discriminating circuit 103 from the reading state discriminating circuit 100. On the basis of the comparison results of the read signal and the focus error signal for the threshold levels, the discriminating circuit 103 in the reading state discriminating circuit 100 generates the focusing servo activation permission signal FOK, namely, a signal to decide the closure of the focus servo loop or a signal indicative of the closure of the focus servo loop. In more detail, as shown on the left side in FIGS. 5B and 5E, when it is detected from the outputs of the comparators 101 and 102 that the read signal RF does not exceed the threshold level Thr or that the focus error signal FE does not exceed the threshold level Thf, the discriminating circuit 103 sets the value of the focusing servo activation permission signal FOK to "L". On the contrary, as shown on the right side in FIGS. 5B and 5E, when it is detected from the outputs of the comparators 101 and 102 that the read signal RF exceeds the threshold level Thr and that the focus error signal FE exceeds the threshold level Thf, the discriminating circuit 103 sets the value of the focusing servo activation permission signal FOK to "H".

The controller 9 discriminates whether the focusing servo activation permission signal FOK during the approaching operation of the objective lens after the shift to step S13 indicates the value of "H" or not (step S14). The discrimination of the signal FOK is executed until the internal timer times out (step S14A). The internal timer is activated at a time point when the processing routine advances from step S12 to step S13. The internal timer times out when counting an enough predetermined time t which is presumed such that an S-shaped curve of the focusing error appears from the start of the approach of the objective lens.

When it is confirmed that the value of the focusing servo activation permission signal FOK indicates "H" as shown on the right side in FIGS. 5D and 5E until the elapse of the predetermined time t, the controller 9 determines that desired read signal and focus error signal were obtained, thereby closing the focus servo loop immediately after the focal position of the read light reached the target recording surface (steps S15, S16, S16A).

In more detail, after the confirmation of the focusing servo activation permission signal FOK of the value "H" as well, the approaching operation of the objective lens is continued in step S15. When the focal point of the read light perfectly enters the focus control range and reaches the target recording surface, for example, the first recording surface, the zero-cross point detection signal FZC showing that the focal point of the read light has reached the first recording surface (zero-cross point FZC (ZC00); refer to FIG. 5C) is generated from the zero-cross point detecting circuit 7. When the zero-cross point is detected in step S16 on the basis of the zero-cross point detection signal FZC, in step S16A, the controller 9 sets the focus-on signal FSON to the high level and controls the switching circuit 10 so as to select the output of the equalizer 8, thereby allowing the focus servo loop to be closed. The processes in this flowchart are finished. After that, the stationary focusing servo operation is continued so that the optimum converging position of the read light is allowed to trace the target recording surface. The processing routine advances to a process such as a pull-in operation of the tracking servo or the like.

In step S14A, as shown on the left side in FIGS. 5E and 5F, if the value of the focus continuation signal FOK is held to be "L" even after the elapse of the predetermined time t, the controller 9 further advances to a gain control flow and discriminates whether the value of the counter n is equal to 4 or not (step S17). When the value of the counter n is equal to 4, it is determined that even if the gain control was performed four times, desired read signal level and focus error signal level were not obtained, so that the error is displayed (step S18). Now, the value "4" used for comparison with the value of n in step S17 is an example and another arbitrary number can be also set. In brief, it is sufficient to use the number such that impossibility of the gain control can be regarded.

When it is decided that the value of the counter n is less than 4 in step S17, the controller 9 advances to step S2, moves the objective lens again so as to be away from the disc, and performs the gain control again. The gain control flow of the second and subsequent times passes through step S9. The gain control flow of the third and subsequent times passes through step S11, holds the gain control signal GCc to be "H" (therefore, the gains of the adding circuits 36 and 37 are held to be high), and changes only the other gain control signals GCr and GCf.

Although the above processes have been described on the assumption that the first recording surface is read as a prerequisite, similar processes can be also executed in case of reading the second recording surface.

In the embodiment, when the focal point of the read light is allowed to approach the target recording surface from the remote position, if the level of the read signal RF (what is called a signal level) does not reach the predetermined threshold value or the level of the focus error signal FE does not reach the predetermined threshold value, the focusing servo is stopped and the gains at predetermined gain control positions in the read signal system and focus servo loop are raised. After completion of the gain control, the focal point of the read light is again allowed to approach the target recording surface from the remote position. In this instance, only when the level of the read signal RF reaches the predetermined threshold value and the level of the focus error signal FE reaches the predetermined threshold value, the focusing servo is performed, thereby allowing the processing routine to advance to the subsequent set-up operation. A desired loop gain of the focusing servo can, consequently, be always obtained irrespective of a difference between the light reflectance of the recording surfaces of the single-layer disc and the double-layer disc or an aging change of the pickup optical system. At the same time, the read signal of an enough large level can be obtained.

The zero-cross point detecting circuit 7 detects the zero-cross point of the focus error signal FE as follows.

That is, as for the negative polarity level of the focus error signal FE, the occurrence of the zero-cross is detected when the level traverses a predetermined threshold value −Vth. As for the positive polarity level of the focus error signal FE, the occurrence of the zero-cross is detected when the level traverses a predetermined threshold value +Vth. As an absolute value of each of the threshold values −Vth and +Vth, a value which makes it possible to discriminate that the focus error signal FE has reached a value that is sufficiently near the zero level from a relatively large absolute value level is set. Actually, it is detected that the focus error signal FE passes a predetermined voltage region.

Although the DVD of the double-layer recording type has been mentioned in the above description, the invention is not limited to such a DVD but can be also applied to the conventional CD of the single-layer recording type and a disc in which information recording surfaces are formed on three or more layers.

In the embodiment, although the gain control of the adding circuits 36 and 37 is performed at only two stages, the invention is not limited to it but the gain can be also obviously controlled at more stages larger than two stages.

In the embodiment, further, although the gain control signal GCc is supplied to control input terminals of the adding circuits 36 and 37 and their gains are controlled, a function that is equivalent to that in the embodiment can be obtained even if the gains of the adding circuit 38 and subtracting circuit 39 at the post stage are controlled by the gain control signal.

In the embodiment, although the reading state discriminating circuit 100 is constructed by using the comparators 101 and 102 and discriminating circuit 103, the invention is not limited to this construction. For example, in the block including the controller 9, the function of the reading state discriminating circuit 100 can be also effected. In this instance, this construction can be also realized by software.

In the embodiment, although the output signal of the equalizer 5 is supplied to the comparator 101, the output signal of the RF amplifier 4 can be also supplied to the comparator 101.

Further, in other words, in the embodiment, both of the level of the read signal and the level of the focus error signal at the time of set-up are evaluated and the gain of the circuit to amplify the read signal and the gain of the circuit to amplify the focus error signal are controlled. The gain control, however, can be also performed by evaluating either one of the read signal level and the level of the focus error signal at the time of set-up. The reason why a similar gain control can be performed by evaluating only one of the levels is because the level shown by the read signal and the level shown by the focus error signal have an extremely intimate correlation.

Although the embodiment has been described above, many other modifications are possible within the purview which can be designed by those skilled in the art.

According to the invention as described above, it is possible to cope with a fluctuation of the optimum gain of the focus servo loop due to the difference of the light reflectance of the recording surfaces or the like and the optimum focal position of the read light can be allowed to preferably trace the target recording surface.

What is claimed is:

1. A focus control apparatus which includes: reading means for irradiating read light to a recording medium having an information recording surface which is formed in at least one layer and generating a read signal on the basis of return light from said recording medium; and a focus servo loop for allowing an optimum converging position of said read light to trace said recording surface in response to a focus error signal generated on the basis of said return light by using a focusing actuator to displace the optimum converging position of said read light in the optical axial direction, said focus control apparatus comprising:
   read signal level detecting means for detecting a level of said read signal;
   read signal amplifying means for amplifying said read signal;
   error signal amplifying means for amplifying said focus error signal; and
   control means for driving said focusing actuator in a set-up mode so that the optimum converging position of said read light approaches said recording surface and for controlling gains of said read signal amplifying means and said error signal amplifying means so that a detection level by said read signal level detecting means in said set-up mode reaches a predetermined level.

2. A focus control apparatus which includes: reading means for irradiating read light to a recording medium having an information recording surface which is formed in at least one layer and generating a read signal on the basis of return light from said recording medium; and a focus servo loop for allowing an optimum converging position of said read light to trace said recording surface in response to a focus error signal generated on the basis of said return light by using a focusing actuator to displace the optimum converging position of said read light in the optical axial direction, said focus control apparatus comprising:
   error signal level detecting means for detecting a level of said focus error signal;
   read signal amplifying means for amplifying said read signal;
   error signal amplifying means for amplifying said focus error signal; and
   control means for driving said focusing actuator in a set-up mode so that the optimum converging position of said read light approaches said recording surface and for controlling gains of said read signal amplifying means and said error signal amplifying means so that a detection level by said error signal level detecting means in said set-up mode reaches a predetermined level.

3. A focus control apparatus having: reading means for irradiating read light to a recording medium having an information recording surface which is formed in at least one layer and generating a read signal on the basis of return light from said recording medium; and a focus servo loop for allowing an optimum converging position of said read light to trace said recording surface in response to a focus error signal generated on the basis of said return light by using a focusing actuator to displace the optimum converging position of said read light in the optical axial direction, said focus control apparatus comprising:
   read signal level detecting means for detecting a level of said read signal;
   error signal level detecting means for detecting a level of said focus error signal;
   read signal amplifying means for amplifying said read signal;
   error signal amplifying means for amplifying said focus error signal; and
   control means for driving said focusing actuator in a set-up mode so that the optimum converging position of said read light approaches said recording surface and for controlling gains of said read signal amplifying means and said error signal amplifying means so that a detection level by said read signal level detecting means in said set-up mode reaches a predetermined level and a detection level by said error signal level detecting means in said set-up mode reaches a predetermined level.

4. An apparatus according to claim 1, further comprising a variable gain type signal forming circuit for generating said read signal and said focus error signal on the basis of said return light by the set gains, and wherein said control means also controls a gain of said variable gain type signal forming circuit besides the gain controls of said read signal amplifying means and said error signal amplifying means.

5. An apparatus according to claim 2, further comprising a variable gain type signal forming circuit for generating said read signal and said focus error signal on the basis of said return light by the set gains, and wherein said control means also controls a gain of said variable gain type signal forming circuit besides the gain controls of said read signal amplifying means and said error signal amplifying means.

6. An apparatus according to claim 3, further comprising a variable gain type signal forming circuit for generating said read signal and said focus error signal on the basis of said return light by the set gains, and wherein said control means also controls a gain of said variable gain type signal forming circuit besides the gain controls of said read signal amplifying means and said error signal amplifying means.

7. An apparatus according to claim 1, wherein said control means executes a stationary focusing servo operation by said focus servo loop in the case where the detection level by said read signal level detecting means in said set-up mode reaches the predetermined level.

8. An apparatus according to claim 2, wherein said control means executes a stationary focusing servo operation by said focus servo loop in the case where the detection level by said error signal level detecting means in said set-up mode reaches the predetermined level.

9. An apparatus according to claim 3, wherein said control means executes a stationary focusing servo operation by said focus servo loop in the case where the detection level by said read signal level detecting means in said set-up mode reaches the predetermined level and the detection level by said error signal level detecting means in said set-up mode reaches the predetermined level.

10. An apparatus according to claim 1, wherein when a state is detected that the detection level by said read signal level detecting means in said set-up mode cannot reach the predetermined level as results of the gain controls of said read signal amplifying means and said error signal amplifying means, said control means performs an error indication.

11. An apparatus according to claim 2, wherein when a state is detected that the detection level by said error signal level detecting means in said set-up mode cannot reach the predetermined level as results of the gain controls of said read signal amplifying means and said error signal amplifying means, said control means performs an error indication.

12. An apparatus according to claim 3, wherein when a state is detected that the detection level by said read signal level detecting means in said set-up mode cannot reach the predetermined level and/or the detection level by said error signal level detecting means in said set-up mode cannot reach the predetermined level as results of the gain controls of said read signal amplifying means and said error signal amplifying means, said control means means performs an error indication.

13. An apparatus according to claim 4, wherein when a state is detected that the detection level by said read signal level detecting means in said set-up mode cannot reach the predetermined level and/or the detection level by said error signal level detecting means in said set-up mode cannot reach the predetermined level as results of the gain controls of said read signal amplifying means, said error signal amplifying means, and said variable gain type signal forming circuit, said control means performs an error indication.

14. A focus control method for performing a focus servo operation by obtaining a focus error signal and an RF signal at proper levels, comprising the steps of:

executing a detecting process for detecting a signal level of at least one of said focus error signal and said RF signal;

executing a discriminating process for discriminating whether said detection signal level exceeds a predetermined level or not as a result of said detecting process;

adjusting amplification factors of amplifiers or forming circuits of said focus error signal and said RF signal so as to increase the signal levels of said focus error signal and said RF signal when said detection signal level does not exceed the predetermined level and again executing said detecting process and said discriminating process; and executing a stationary focus servo operation by a focus servo loop when said detection signal level exceeds the predetermined level.

* * * * *